United States Patent [19]
Von Benken et al.

[11] Patent Number: 5,076,049
[45] Date of Patent: Dec. 31, 1991

[54] PRETENSIONED FRAME

[75] Inventors: John D. Von Benken; Alan M. Carter, both of Cincinnati, Ohio

[73] Assignee: General Electric Company, Cincinnati, Ohio

[21] Appl. No.: 502,971

[22] Filed: Apr. 2, 1990

[51] Int. Cl.⁵ .............................................. F02C 7/20
[52] U.S. Cl. .................................. 60/39.31; 60/39.32; 415/138; 415/142
[58] Field of Search ............................ 60/39.31, 39.32; 415/138, 142

[56] References Cited

U.S. PATENT DOCUMENTS

| | | | |
|---|---|---|---|
| 2,928,648 | 3/1960 | Haines et al. | 415/138 |
| 2,938,336 | 5/1960 | Peterson | 60/39.5 |
| 4,055,041 | 10/1977 | Adamson et al. | 60/226 R |
| 4,142,365 | 3/1979 | Sargisson et al. | 60/226.1 |
| 4,249,859 | 2/1981 | Benyi, Jr. et al. | 415/79 |
| 4,458,863 | 7/1984 | Smith | 244/54 |
| 4,478,551 | 10/1984 | Honeycutt et al. | 415/142 |
| 4,492,078 | 1/1985 | Williamson | 60/39.31 |
| 4,571,936 | 2/1986 | Nash et al. | 60/39.31 |
| 4,979,872 | 12/1990 | Myers et al. | 415/142 |
| 4,987,736 | 1/1991 | Ciokajlo et al. | 60/39.31 |

Primary Examiner—Louis J. Casaregola
Attorney, Agent, or Firm—Jerome C. Squillaro

[57] ABSTRACT

An improved lightweight frame for gas turbine engine is disclosed. The frame includes a hub and a radially spaced casing with two rows of circumferentially spaced tie rods extending between the hub and the casing. In a preferred embodiment, jam nuts are provided on the tie rods for accommodating compressive loads therein. The tie rods are pretensioned so that during operation in a gas turbine engine, for example, wherein the tie rods are heated by combustion gases, thermal expansion of the tie rods and resulting compressive stress will be accommodated by the pretension so that in a preferred embodiment the tie rods may operate nearly stress free at normal operation. The two rows of tie rods and jam nut pairs allow the frame to accommodate effectively blade-out loads channeled to the frame 30.

17 Claims, 2 Drawing Sheets

PRETENSIONED FRAME

TECHNICAL FIELD

The present invention relates generally to gas turbine engine frames, and, more specifically, to a frame subject to compressive buckling loads and thermal expansion and contraction.

BACKGROUND ART

Gas turbine engines include frames for supporting bearings which support rotor shafts therein. A turbine frame, for example, is disposed downstream of a conventional turbine and is subject to hot combustion gases discharged therefrom. The turbine frame also supports a shaft connected to a fan and is therefore subject to substantial blade-out loads upon failure of a blade on the fan connected thereto which results in unbalance forces transmitted through the shaft.

In order to accommodate thermal expansion and contraction of the turbine frame due to the hot combustion gases flowable therethrough, and to accommodate the fan blade-out loads transmitted through the shaft supported in the turbine frame, the turbine frame is conventionally a relatively complex and heavy structure.

OBJECTS OF THE INVENTION

Accordingly, one object of the present invention is to provide a new and improved frame for a gas turbine engine.

Another object of the present invention is to provide a frame effective for accommodating thermal expansion and contraction thereof.

Another object of the present invention is to provide a frame effective for accommodating fan blade-out loads transmitted thereto.

Another object of the present invention is to provide a frame which is relatively simple and lightweight.

Another object of the present invention is to provide a frame effective for operating in a gas turbine engine at reduced stress.

DISCLOSURE OF INVENTION

A pretensioned frame for a gas turbine engine includes an annular hub spaced from an annular casing and having axially spaced first and second rows of circumferentially spaced tie rods joining the hub to the casing. The tie rods are pretensioned for generating a predetermined amount of tension in the tie rods.

BRIEF DESCRIPTION OF DRAWINGS

The novel features believed characteristic of the invention are set forth and differentiated in the claims. The invention, in accordance with a preferred, exemplary embodiment, together with further objects and advantages thereof, is more particularly described in the following detailed description taken in conjunction with the accompanying drawing in which:

MODE(S) FOR CARRYING OUT THE INVENTION

Figures 1, 2:
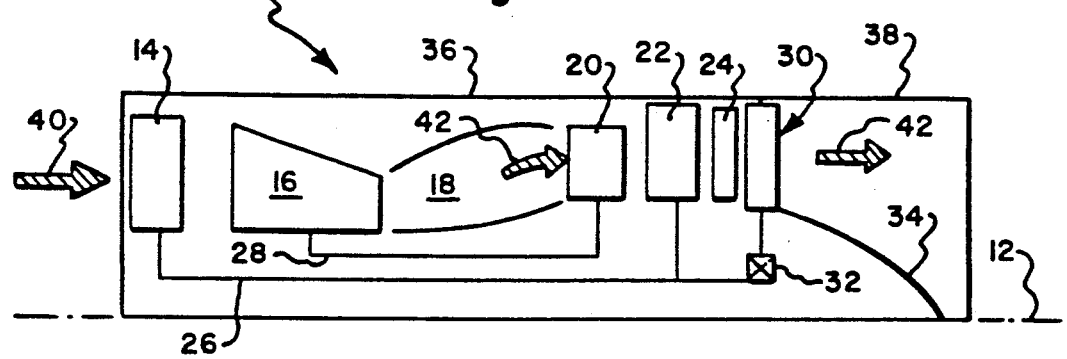
FIG. 1 is a schematic representation of a gas turbine engine including a frame in accordance with one embodiment of the present invention.
FIG. 2 is an enlarged, partially sectioned side view of the turbine frame illustrated in FIG. 1.

Illustrated in FIG. 1 is a gas turbine engine 10 having a longitudinal axial centerline 12. The engine 10 includes a conventional fan 14 having a plurality of circumferentially spaced fan blades which is followed in turn by a conventional compressor 16, combuster 18, high pressure turbine (HPT) 20, low pressure turbine (LPT) 22 and outlet guide vanes (OGV) 24 which are all annular and disposed circumferentially about the centerline 12. The fan 14 is joined to the LPT 22 by a conventional LPT shaft 26. The compressor 16 is joined to the HPT 20 by a conventional HPT shaft 28.

A turbine frame 30 in accordance with an exemplary embodiment of the present invention is disposed downstream of the OGVs 24 and supports a conventional bearing 32 which supports a downstream end of the LPT shaft 26. Extending downstream from the frame 30 is a conventional exhaust centerbody cone 34. Surrounding the engine is a conventional outer casing 36 and exhaust nozzle 38 extending downstream from the casing 36 and spaced radially outwardly of the centerbody 34.

In operation, ambient air 40 is drawn into the fan 14 and in turn through the compressor 16, where it is pressurized and then channeled to the combustor 18 for mixing with fuel for being burned and producing hot combustion gases 42 which are discharged from the combustor 18 into the HPT 20. The gases 42 rotate the HPT 20 which in turn rotates the compressor 16 through the shaft 28. The gases 42 then flow through the LPT 22 which rotates the LPT 22 and in turn rotates the fan 14 through the shaft 26. The gases 42 are then channeled through the OGVs 24 and through turbine frame 30 and are discharged from the engine through the exhaust nozzle 38.

Illustrated in more particularity in FIG. 2, is the turbine frame 30 in accordance with one embodiment of the present invention disposed downstream from the OGVs 24 and supporting the LPT shaft 26 through the bearing 32. Frame 30 includes an annular inner hub 44 and an annular outer casing 46 spaced radially outwardly from the hub 44. The casing 46 is conventionally joined to the low pressure turbine 22, for example, to the casing of the LPT 22, and is disposed radially inwardly of the fan duct 36. The outer casing 46 is preferably in the form of a polygon, for example having ten sides as shown, for providing a relatively large flowpath annulus between the outer casing 46 and the fan duct 36 for channelling fan air. Alternatively, the outer casing 46 could be cylindrical, if desired.

Figure 3:
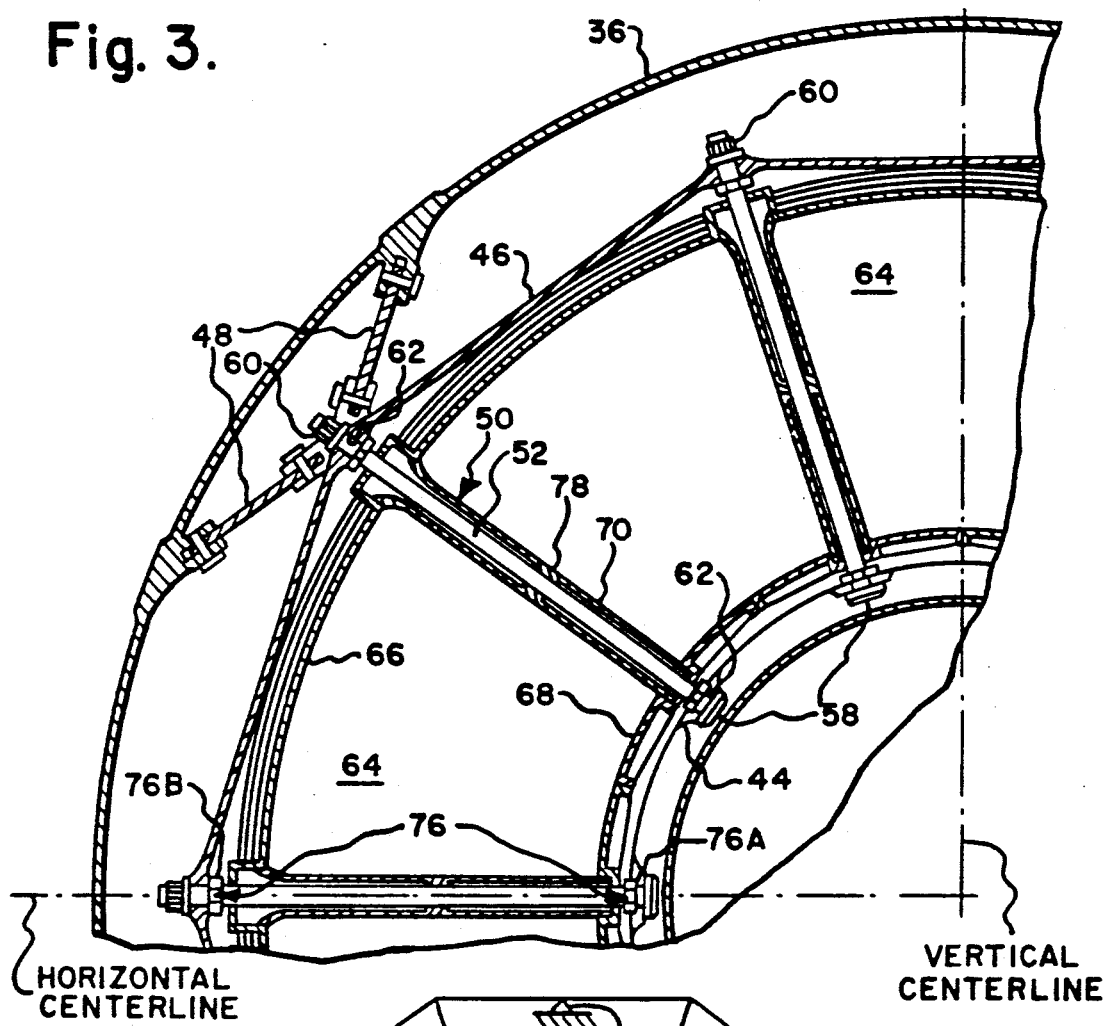
FIG. 3 is an end view of the frame illustrated in FIG. 2 taken along section line 3—3 showing a quarter section of the turbine frame.

Referring to both FIGS. 2 and 3, the outer casing 46 is shown as being conventionally connected to the fan duct 36 by four equidistantly and circumferentially spaced pairs of conventional links 48 (only one link pair being illustrated in FIG. 3). The frame 30 further includes a first, upstream row 50 of a plurality of circumferentially spaced elongate first tie rods 52 joining the hub 44 to the outer casing 46 and a second, downstream row 54 of a plurality of circumferentially spaced elongate second tie rods 56 joining the hub 44 to the outer casing 46 and spaced axially downstream from the tie rod first row 50. The first and second tie rods 52, 56 are predeterminately pretensioned for generating a predetermined amount of tension in the first and second tie rods 52, 56 for providing structural rigidity to the assembly of elements 44, 46, 50 and 54 forming the frame 30, and accommodating operational thermal loading and blade-out failures of the fan 14 as described in more particularity hereinbelow.

Each of the first and second tie rods 52, 56 preferably comprises an elongate bolt including a head 58 at a first end thereof which is disposed on the radially inner surface of the hub 44. Each of the tie rods 52, 56 also includes an adjustable nut 60 at an opposite, second end thereof with the nut 60 being threadingly engaged on the tie rod bolts 52, 56 so that they are adjustable. The nuts 60 are disposed on the radially outer surface of the outer casing 46 so that the hub 44 and the outer casing 46 are positioned between the bolt head 58 and the nut 60, respectively. The tie rod bolts 52, 56 extend through respective holes 62 in the hub 44 and the outer casing 46 and are slidable therein.

In accordance with one object of the present invention, the tie rods 52, 56 are predeterminately pretensioned by tightening the nuts 60 for drawing together the hub 44 and the outer casing 46. The tie rods 52 and 56 are preferably uniformly pretensioned so that a predetermined amount of tension is generated in all the first and second tie rods 52, 56. The outer casing 46 will then be subject to compressive hoop stresses and the hub 44 will be subject to tensile hoop stresses. The amount of pretension is selected based on the expected amount of thermal expansion of the tie rods 52, 56 during normal engine operation such as for example at cruise speed of the gas turbine engine 10 powering an aircraft in flight. The combustion gases 42 heat and longitudinally expand or elongate the tie rods 52, 56 during operation which will correspondingly decrease the amount of pretension in the tie rods 52, 56. It is preferred that the amount of pretension in the tie rods 52, 56 be sufficiently large to accommodate the expected amount of thermal expansion of the tie rods 52, 56 which reduces the pretension so that at least a minimum amount of pretension remains in the tie rods 52, 56 under normal engine operation. That minimum amount may be zero, although an appropriate larger amount should be effected to accommodate any non-uniformity in the pretensioning or due to normal inaccuracies due to tolerances and stack-up, for example.

The hub 44 and the outer casing 46 are radially spaced from each other to define an annular flowpath 64 therebetween, and in more particularity, the frame 30 includes an outer flowpath liner panels 66 suitably secured adjacent to the outer casing 46 for defining an upper flowpath wall, and an inner flowpath liner panel or liner panels 68 suitably secured adjacent to the hub 44 for defining a lower flowpath wall. The outer and inner flowpath liner panels 66, 68 confine the combustion gases 42 and provide shields to protect the outer casing 46 and the hub 44 from the combustion gases.

The frame 30 further includes a plurality of flowpath fairings 70, each fairing 70 enclosing a respective axially spaced pair of the first and second tie rods 52, 56 as illustrated for example in FIG. 2 with reference to tie rods 52A and 56A. The fairing 70 extends from the hub 44 to the outer casing 46, and, for example, extends from the inner panel 68 to the outer panel 66.

The frame 30 further includes a conventional bearing support housing 72 extending radially inwardly and axially from the hub 44 and conventionally secured thereto. The housing 72 includes an integral bearing support 74 which supports the bearing 32 and which is spaced axially upstream from both the first and second tie rod rows 50 and 54 in the embodiment illustrated. The LPT shaft 26 is conventionally disposed radially inwardly of the bearing 32, and is supported thereby.

In the event of a blade-out condition wherein one or more of the fan blades in the fan 14, or fragment thereof, is ejected during operation of the engine 10, a substantial imbalance load will be transmitted through the LPT shaft 26 and through the bearing 32. The blade-out imbalance load will then be carried through the bearing support housing 72 and to the hub 44. The frame 30 should preferably include stabilizing means for accommodating such blade-out loads which may alternatively be identified as compressive loads being channeled to the hub 44. The stabilizing means includes in one embodiment, a pair of jam nuts 76 disposed on threads on each tie rod 52, 56 subject to the blade-out compressive loads. In the preferred embodiment, the jam nut pair 76 is disposed on all of the first and second tie rods 52, 56. The jam nut pair 76 includes a first jam nut 76A disposed each of on the tie rods 52, 56 adjacent to the hub 44 for preventing the respective tie rod 52, 56 from sliding through the hole 62 of the hub 44. A second jam nut 76B is disposed on each of the tie rods 52, 56 adjacent to the outer casing 46 for preventing the respective tie rod 52, 56 from sliding through the hole 62 of the casing 46.

By utilizing the jam nut pairs 76, the blade-out compressive load which is channeled through the bearing support housing 72 into the hub 44 is then effectively channeled through the tie rods 52, 56 and into the outer casing 76 since the tie rods 52, 56 can't slide in the holes 62. The jam nut pair 76 provides stability to the frame 30 by providing increased rigidity for channeling the compressive blade-out loads. The tie rods 52, 56 will experience a compressive component of stress from the blade-out compressive load which will decrease the pretension stress therein. The pretension stress may even be overcome where the experienced blade-out load is sufficiently high, and the jam nut pairs 76 thereby provide an effective means to stabilize the frame 30 and allow the blade-out compressive loads to be channeled to the outer casing 46 through the first and second tie rod rows 50, 54.

Inasmuch as the bearing 32 is spaced axially upstream from at least one, and in the embodiment illustrated both, of the tie rod first and second rows 50 and 54, and therefore is not coplanar therewith, an overturning moment due to the blade-out load will also be channeled through the bearing support housing 72 to the hub 44. By utilizing the two rows 50 and 54 of tie rods axially spaced from each other, the blade-out overturning moment can be effectively accommodated by the tie rod rows 50 and 54. In contrast, a single tie rod row subject to such blade-out overturning moment would allow for rotational movement of the hub 44 relative to the single tie rod row which could introduce undesirable distortion and stress in the frame.

Furthermore, in an embodiment of the invention utilizing the jam nut pairs 76, upon thermal expansion of the tie rods 52, 56, the jam nut pairs 76 oppose the expansion against the hub 44 and the outer casing 46, and thusly generate compressive loads in the tie rods 52, 56. Since the tie rods 52, 56 are elongate they are subject to buckling under the compressive loads. In accordance with the preferred embodiment of the present invention, the stabilizing means further includes the fairing 70 including bosses 78 as illustrated in FIGS. 2 and 3 encircling the first and second tie rods 52, 56 at a predetermined radial position along the tie rods for providing lateral restraint of the tie rods 52, 56 at the bosses 78. As best illustrated in FIG. 2, the bosses 78 are integral portions of the fairing 70 which encircle and contact the tie rods 52, 56, to provide a lateral restraint to the tie rods 52, 56 for increasing the buckling resistance thereof. As illustrated in FIG. 3, the bosses 78 are preferably located midway between the casing 46 and the hub 44 for providing the most effective lateral restraint for the simple first mode bending of the tie rods 52, 56 for increasing buckling resistance. Additional bosses 78 may be disposed at other radial positions along the tie rods 52, 56 as desired for further increasing buckling resistance.

In the embodiment of the invention illustrated in FIG. 2, including the jam nut pairs 76, compressive stresses will be generated by the tendency of the tie rods 52, 56 to expand during normal operation due to the hot combustion gases 42 which heat the tie rods 52, 56. The pretension in the first and second tie rods 52, 56 is also preselected to be preferably greater than those compressive stresses introduced therein by the combustion gases 42.

Figure 4:
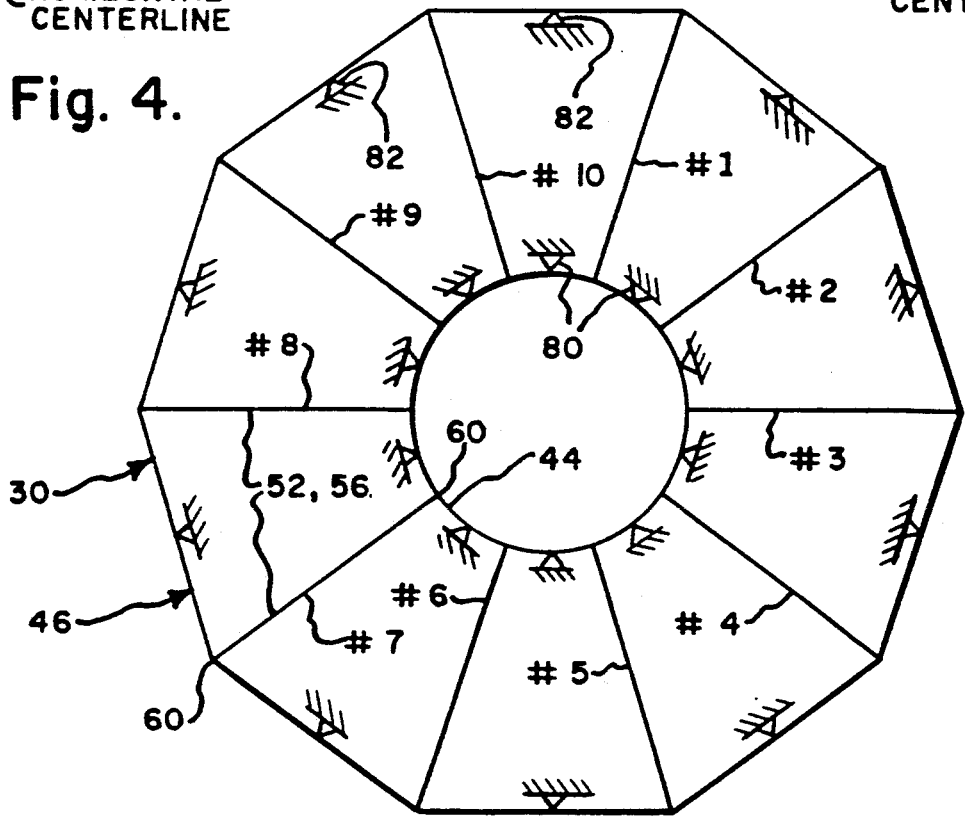
FIG. 4 is a schematic representation of the turbine frame for illustrating assembly of the elements of the turbine frame.

Illustrated in FIG. 4 is a schematic representation of the frame 30 including the inner hub 44 and the outer casing 46 and the tie rods 52, 56 extending therebetween. Each spoke illustrated in FIG. 4 represents the position of the first tie rods 52 or the second tie rods 56. During assebly of the frame 30, the hub 44 is suitably positioned on a plurality of circumferentially spaced inner support fixtures 80, preferably one for each tie rod pair 52, 56. The outer casing 46 is similarly supported on a plurality of circumferentially spaced outer support fixtures 82, preferably one for each tie rod pair 52, 56. The first and second tie rods 52 and 56 are individually placed through the respective holes 60 in the hub 44 and the outer casing 46 and the nuts 60 and 76 are loosely fitted. The tie rods 52, 56 are then individually tightened in a preferred sequence by torquing the nuts 60 to ensure that the frame 30 is uniformily pretensioned. One example of a preferred tightening sequence of the tie rods 52, 56 includes tightening the tie rods in the following order as they are identified in FIG. 4: 1, 6, 4, 9, 2, 7, 5, 10, 3 and 8. At each of the steps in the tightening sequence, both the first tie rod 52 and its respective axially spaced second tie rod 56 is tightened before proceeding to the next step. This tightening sequence basically starts with any, i.e., first, tie rod pair followed in turn by an opposite, second tie rod pair disposed generally 180° from the first tie rod pair and then follows in turn by a third tie rod pair disposed generally equi-spaced between the first and second tie rod pairs followed in turn by a fourth tie rod pair disposed generally 180° from that preceding third tie rod pair, and this sequence continues until all of the tie rods have been uniformily tightened to ensure uniform pretensioning of all the tie rods 52, 56. It is preferred that the sequence be repeated several times, increasing the torque of the nuts 60 with each sequence until the desired pretension is reached. Then, the jam nuts 76 are tightened against the respective hub 44 and outer casing 46.

Since the basic frame 30 described above includes the hub 44, the outer casing 46 and the first and second tie rod rows 50 nd 54 without additional support struts, the frame 30 is a relatively simply and lightweight assembly which provides a significant weight reduction in the engine 10. Furthermore, since the first and second tie rods 52, 56 are pretensioned at assembly, when utilized in an engine operating at normal temperatures, such as for example at cruise speeds of the engine 10 while powering an aircraft, the tie rods 52, 56 may be nearly stress free because the pretension can be predeterminately selected to be equal to or slightly greater than the compressive stress in the tie rods 52, 56 resulting from operational thermal loading or expansion of the tie rods 52, 56.

The stabilizing means including the bosses 78 for lateral support and the jam nut pairs 76 allow the use of relatively long and slender tie rod bolts 52 and 56 to carry significant compressive load in the event of a fan blade-out condition. Such relatively slender tie rods 52, 56 are a factor in providing significant weight reduction in the frame 30. Furthermore, since tie rods 52, 56 utilizing adjustable nuts 60 are found in the frame 30, the frame 30 can be tuned to particular operating conditions. For example, if it is desired to operate the engine 10 at increased temperatures of the combustion discharge gases 42, the nuts 60 may be correspondingly additionally tightened for providing additional tension for accommodating the increased thermal loading and compressive stresses in the tie rods 52, 56.

Yet further, the use of axially spaced rows 50, 54 of tie rods 52, 56 provides effective accommodation of blade-out overturning moments channeled through the bearing support housing 72 to the hub 44 of the frame 30. In such a condition, the jam nut pairs 76 assists in accommodating the moment by accommodating compressive stresses in the tie rods 52, 56. In the blade-out situation, it may be that one of the tie rods rows 50, 54 would be subject to tension while the other of the tie rod rows 50, 54 would be subject to compression, in which case, the former tie rod accommodates tension while the latter tie rod accommodates compression utilizing the jam nut pair 76 and bosses 78.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly what is desired to be secured by Letters Patent of the United States is the invention as defined and differentiated in the following claims.

We claim:

1. A pretensioned frame for a gas turbine engine comprising:
    an annular hub;
    an annular casing spaced radially outwardly from said hub;
    a first row of a plurality of circumferentially spaced first tie rods joining said hub to said casing;
    a second row of a plurality of circumferentially spaced second tie rods joining said hub to said casing and spaced axially from said first row; and
    said first and second tie rods being pretensioned for generating a predetermined amount of tension in said first and second tie rods subjecting said casing to compressive hoop stress and said hub to tensile hoop stress, and for providing structural rigidity to the assembly of said hub, said casing, said first tie rods, and said second tie rods without additional support struts.

2. A frame according to claim 1 wherein each of said first second tie rods comprises an elongate bolt including a head at a first end thereof and an adjustable nut at an opposite end thereof, said nut being adjustable on said bolt for selectively applying said predetermined amount of tension in said bolt.

3. A frame according to claim 1 wherein said hub and casing are radially spaced from each other to define a flowpath therebetween and said frame further includes a plurality of fairings, each enclosing a respective axially spaced pair of said first and second tie rods and each extending from said hub to said casing.

4. A frame according to claim 1 further including a bearing support housing fixedly joined to said hub.

5. A frame according to claim 4 wherein said housing includes a bearing support spaced axially from both said first and second tie rod rows.

6. A frame according to claim 1 wherein said first and second tie rods are elongate and subject to buckling under compressive loads and said frame further includes stabilizing means for accommodating said compressive loads in said first and second tie rods.

7. A frame according to claim 6 wherein said stabilizing means comprises a pair of jam nuts disposed between said hub and said casing and on each of said first and second tie rods subject to compressive loads, said jam nut pair including a first jam nut disposed on said tie rod adjacent to said hub for preventing said tie rod from sliding through said hub, and a second jam nut disposed on said tie rod adjacent to said casing for preventing said tie rod from sliding through said casing.

8. A frame according to claim 6 wherein said stabilizing means comprises a fairing enclosing an axially spaced pair of said first and second tie rods subject to compressive loads, said fairing including bosses encircling said first and second tie rods at a predetermined radial position along said tie rod pair for providing lateral restraint of said first and second tie rods at said bosses.

9. A frame according to claim 8 wherein said predetermined radial position is midway between said casing and said hub.

10. A frame according to claim 1 further including:
a bearing support housing fixedly joined to said hub and including a bearing support spaced axially from both said first and second tie rod rows;
each of said first and second tie rods comprising an elongate bolt subject to buckling under compressive loads and including a head at a first end thereof and an adjustable nut at an opposite end thereof, said nut being adjustable on said bolt for applying said predetermined amount of tension in each of said first and second tie rods; and stabilizing means for accommodating said compressive loads in said first and second tie rods.

11. A frame according to claim 10 wherein said stabilizing means comprises a pair of jam nuts disposed between said hub and said casing and on each of said first and second tie rods subject to buckling under compressive loads, said jam nut pair including a first jam nut disposed on said tie rod adjacent to said hub for preventing said tie rod from sliding through said hub, and a second jam nut disposed on said tie rod adjacent to said casing for preventing said tie rod from sliding through said casing.

12. A frame according to claim 11 wherein said hub and casing are radially spaced from each other to define a flowpath therebetween and said frame further includes a plurality of fairings, each enclosing a respective axially spaced pair of said first and second tie rods and each extending from said hub to said casing; and wherein said stabilizing means comprises bosses in said fairing encircling said first and second tie rods at a predetermined radial position along said tie rod pair for providing lateral restraint of said first and second tie rods at said bosses.

13. A frame according to claim 12 wherein said predetermined radial position is midway between said casing and said hub.

14. A frame according to claim 13 wherein said gas turbine engine further includes a fan and a low pressure turbine joined to a LPT shaft and wherein said LPT shaft is supported at an aft end at said bearing support and said flowpath is disposed downstream of said low pressure turbine for receiving hot combustion gases therefrom; and said first and second tie rods are predeterminably pretensioned for accommodating compressive stress introduced into said first and second tie rods from heating thereof by said combustion gases.

15. A frame according to claim 14 wherein said pretension in said first and second tie rods is greater than said compressive stresses introduced therein by said heating from said combustion gases.

16. A frame according to claim 10 wherein said gas turbine engine further includes a fan and a low pressure turbine joined to a LPT shaft and wherein said LPT shaft is supported at an aft end at said bearing support and said flowpath is disposed downstream of said low pressure turbine for receiving hot combustion gases therefrom; and said first and second tie rods are predeterminably pretensioned for accommodating compressive stress introduced into said first and second tie rods from heating thereof by said combustion gases.

17. A frame according to claim 16 wherein said pretension in said first and second tie rods is greater than said compressive stresses introduced therein by said combustion gases.

* * * * *